(12) United States Patent
Ripperger

(10) Patent No.: US 7,776,300 B2
(45) Date of Patent: *Aug. 17, 2010

(54) PROCESS FOR REMOVING SULFUR FROM A FUEL GAS STREAM

(75) Inventor: Gary Lee Ripperger, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/126,391

(22) Filed: May 23, 2008

(65) Prior Publication Data

US 2009/0060807 A1    Mar. 5, 2009

Related U.S. Application Data

(60) Provisional application No. 60/940,217, filed on May 25, 2007.

(51) Int. Cl.
*B01D 53/52* (2006.01)

(52) U.S. Cl. .................. 423/242.1; 423/220; 423/226; 423/230; 423/241.2; 423/244.01; 423/244.09; 585/841; 585/250; 585/258

(58) Field of Classification Search .............. 423/220, 423/226, 230, 242.1, 242.2, 244.01, 244.05; 585/841, 250, 258
See application file for complete search history.

(56) References Cited

U.S. PATENT DOCUMENTS

| | | | |
|---|---|---|---|
| 5,401,391 A | 3/1995 | Collins et al. ........... | 208/208 R |
| 6,083,378 A | 7/2000 | Gildert et al. ............... | 208/209 |
| 2004/0000507 A1* | 1/2004 | de Almeida et al. ......... | 208/213 |
| 2004/0026298 A1* | 2/2004 | Ellis et al. ................... | 208/210 |
| 2004/0055935 A1 | 3/2004 | Bakshi ....................... | 208/213 |

FOREIGN PATENT DOCUMENTS

| | | |
|---|---|---|
| GB | 1044771 | 10/1966 |
| WO | WO2006013206 | 2/2006 |

OTHER PUBLICATIONS

Utility U.S. Appl. No. 12/101,036, filed Apr. 10, 2008.

* cited by examiner

*Primary Examiner*—Steven Bos
*Assistant Examiner*—Pritesh Darji
(74) *Attorney, Agent, or Firm*—Charles W. Stewart

(57) ABSTRACT

Disclosed is a process for removing sulfur from a fuel gas stream that comprises an organic sulfur compound and a light olefin. The process includes introducing a fuel gas stream into an elongated hydrotreating reactor vessel in which it is contacted with a hydrodesulfurization catalyst under hydrodesulfurization process conditions. A quench gas stream is also introduced into the elongated hydrotreating reactor vessel at a location below the point of introduction of the fuel gas stream. A reactor effluent is yielded that contains hydrogen sulfide and a significantly reduced organic sulfur concentration that is below the organic sulfur concentration of the fuel gas stream.

16 Claims, 1 Drawing Sheet

PROCESS FOR REMOVING SULFUR FROM A FUEL GAS STREAM

Figure 1:
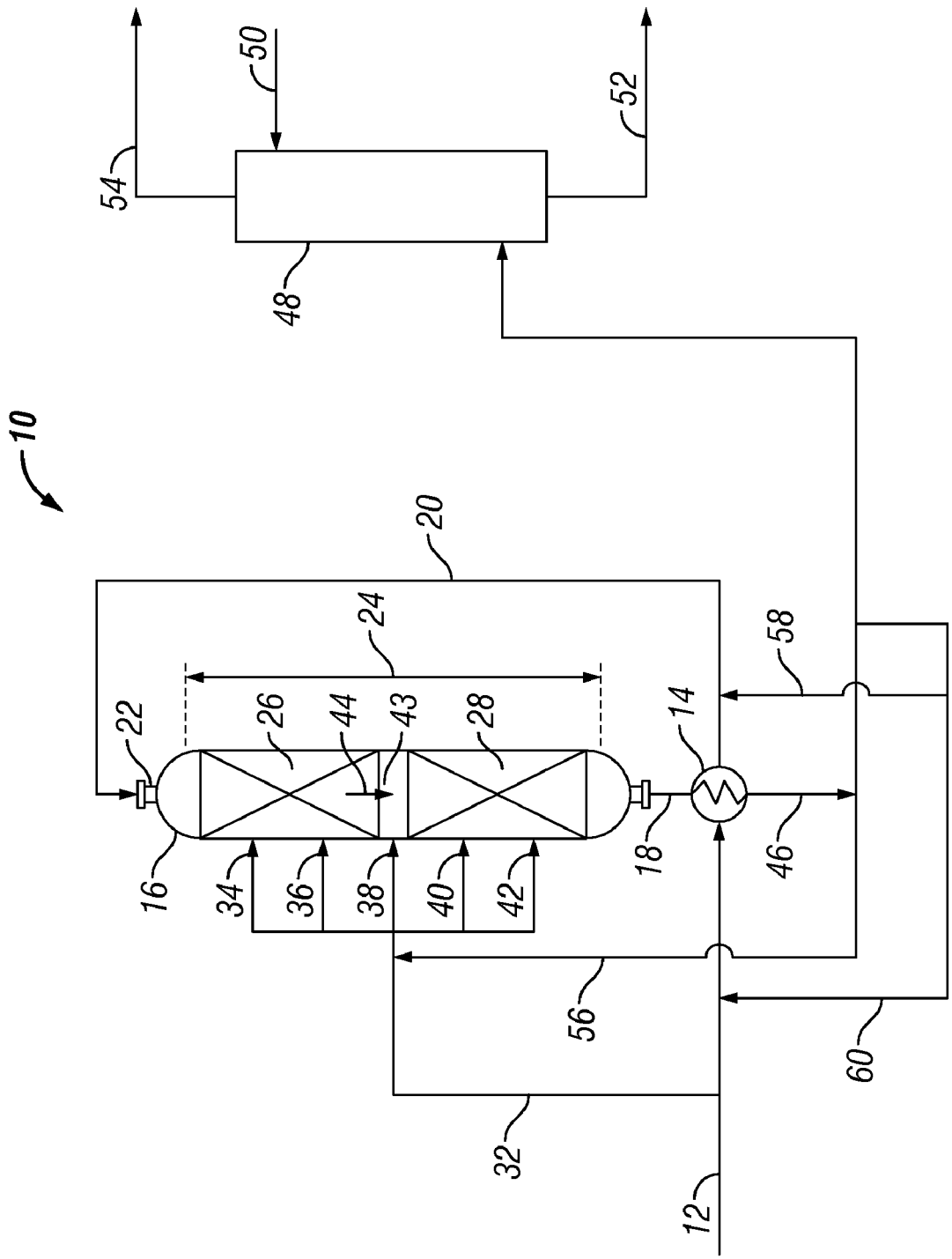

This application claims the benefit of U.S. Provisional Application No. 60/940,217 filed May 25, 2007, the entire disclosure of which is hereby incorporated by reference.

The invention relates to a process for the removal of sulfur from a fuel gas stream.

There are presently federal regulations that impose certain maximum total sulfur concentration limits on refinery fuel gas streams and there is a trend in certain states and municipalities toward the imposition of even more stringent sulfur requirements for these streams. Among the various approaches that are useful in removing sulfur from refinery fuel gas streams to meet the sulfur regulations, caustic scrubbing and absorption methods are typically used. However, with the significantly lower limits that are being placed on the amount of total sulfur that may be contained within a refinery fuel gas stream, these methods tend to be unsuitable for providing treated refinery fuel gas streams that meet the lower sulfur concentration requirements. Certain of the refinery fuel gas streams such as a coker unit dry gas or a fluid catalytic cracking unit gas can contain concentrations of carbonyl sulfide (COS) and other sulfur compounds that are difficult to acceptably be removed therefrom by traditional caustic or absorption scrubbing and other methods to the lower sulfur concentration levels required by the newer regulations.

An alternative to the use of caustic or absorption scrubbing of sulfur from natural gas streams is the process that is disclosed in WO 2006/013206 for the removal of mercaptan compounds from a natural gas stream by contacting the natural gas stream with a hydrodesulfurization catalyst in the presence of hydrogen to yield a treated natural gas stream that is depleted of mercaptans and enriched with hydrogen sulfide. Hydrogen sulfide is removed from the treated natural gas stream to provide a purified natural gas stream. The hydrodesulfurization catalyst may comprise a Group VIII (e.g. cobalt and nickel) metal and a Group VIB (e.g. molybdenum and tungsten) metal placed on a support such as alumina, titania, silica, zirconia, and silica-alumina. The natural gas of the natural gas stream is mainly methane, but it further can comprise lower alkanes such as ethane, propane, butane, and pentane, and, if the natural gas stream contains an inert gas, it is preferred for it to not contain a synthesis gas due to it being reactive in the presence of the hydrodesulfurization catalyst.

It is recognized that the process of publication WO 2006/013206 is directed to the removal of mercaptan compounds from natural gas that, typically, primarily contains lower alkane hydrocarbons with no significant concentrations of olefin compounds or aromatic and other sulfur compounds. It is also significant to note that this publication indicates a preference for the treatment of a natural gas stream that does not contain a synthesis gas due to it being reactive in the presence of the hydrodesulfurization catalyst of the process.

U.S. patent application Ser. No. 11/659,059 is the US national phase filing of International Application No. PCT/EP2005/053770 (WO 2006/013206) and is incorporated herein by reference.

Another of the attributes of several of the refinery fuel gas streams, such as the aforementioned coker dry gas and fluid catalytic cracking fuel gas streams, in addition to the particular types and amounts of sulfur compounds that are present therein, is that they can contain significant concentrations of lower olefins, such as ethylene, propylene and butylenes. The presence of these lower olefins makes the hydrotreating of refinery fuel gas streams difficult due to problems related to the handling of the exotherm that results from the saturation of the olefin bonds and, in general, just controlling the chemistry of the olefin saturation. But, furthermore, traditionally, there has been no need to use such a severe desulfurization technique; because, before the imposition of the aforementioned lowered refinery fuel gas sulfur concentration requirements, the traditional caustic or absorption scrubbing methods have been suitable.

The catalytic hydrotreating of refinery fuel gas streams is also difficult because of the types of olefins contained in them are predominantly the lighter olefins of ethylene and propylene. Because there is not a wide range of olefins of various molecular weights and reactivity contained in a refinery fuel gas stream to be hydrotreated, when it comes into contact with the hydrotreating catalyst of a hydrotreating reactor, most of the saturation reactions occur very close to the initial layers of the catalyst bed to which the fuel gas stream is contacted. Thus, the highly exothermic olefin saturation reactions do not occur throughout the catalyst bed of a reactor, but, instead, they are localized near the initial contact layer of the catalyst bed. This localization of the saturation reactions makes it difficult to handle the temperature rise across the reactor bed.

It is, thus, desirable to have a process that can suitably treat a gas stream having a significant concentration of difficult to remove sulfur compounds to yield a treated gas stream with a significantly reduced concentration of sulfur.

It is also desirable to have a process for treating a refinery fuel gas stream that contains a significant concentration of lower olefins and organic sulfur compounds in order to provide a treated refinery fuel gas stream having a significantly reduced sulfur concentration.

It is further desirable to have a process that can more effectively handle the hydrotreating of a fuel gas stream having a concentration of light olefins and, in particular, effectively handle the localization of heat release that results from the catalytic saturation of a narrow range of light olefins that are contained in a fuel gas stream that is being hydrotreated.

Accordingly, provided is a process for removing sulfur from a fuel gas stream that comprises an organic sulfur compound and a light olefin, wherein said process comprises: introducing said fuel gas stream at a first introduction point into an elongated reactor vessel having a length and containing a bed of a hydrodesulfurization catalyst wherein said fuel gas stream is contacted with said hydrodesulfurization catalyst under hydrodesulfurization process conditions; introducing a quench gas stream at a second introduction point into said elongated reactor vessel at a location along said length of said elongated reactor vessel that is below said first introduction point; and yielding from said elongated reactor vessel a reactor effluent containing hydrogen sulfide and a significantly reduced organic sulfur concentration that is below the organic sulfur concentration of said fuel gas stream.

FIG. 1 is a process flow schematic that presents one or more embodiments of the inventive process for removing sulfur from a fuel gas stream that contains organic sulfur and light olefins and to further provide a treated fuel gas stream having a low sulfur concentration.

The invention relates to the processing of a fuel gas stream that contains a concentration of at least one organic sulfur compound and a significant concentration of at least one light olefin in order to remove from the fuel gas stream a significant portion of the organic sulfur contained therein. A more specific embodiment of the inventive process is directed to the processing of a refinery fuel gas stream to remove sulfur therefrom in order to provide a fuel gas that meets maximum sulfur content limits before it may be combusted.

Sulfur concentration limits are progressively being lowered as regulatory agencies impose stricter standards upon refineries, and in the case of refinery fuel gas streams, in some geographic areas the required sulfur concentration limits are being reduced considerably. These reductions require special processing of the various refinery fuel gas streams in order to remove significant quantities of sulfur compounds that can be difficult to remove by the traditional methods.

The inventive process provides for the removal of sulfur from fuel gas streams, and in particular, refinery fuel gas streams, with the yielding of treated fuel gas having extraordinarily low concentration of sulfur. It further provides a solution to some of the aforementioned concerns and problems that are associated with the hydrotreating of certain refinery fuel gas streams that contain difficult to remove sulfur compounds and high concentrations of light olefins. One characteristic of the fuel gas stream of the inventive process is that it has a significant concentration of at least one light or lower olefin compound, such as, ethylene, propylene, butenes and pentenes. And, as is typical for refinery fuel gas streams, the lower olefin compound is that selected from the group consisting of ethylene, propylene, butylenes and any combination thereof. The more typical lower olefin is either ethylene or propylene or both ethylene and propylene.

The presence of these olefins have normally not posed a problem with the application of traditional sulfur removal methods, and, prior to the aforementioned more stringent sulfur regulations, the presence of the olefins would have generally prevented one skilled in the art from considering the application of hydrodesulfurization methods to treat fuel gas streams that contain significant concentrations of such olefins. This is because the presence of large concentrations of light olefins in a refinery fuel gas stream would be anticipated to release so much heat upon their hydrogenation that it would be difficult to hydrodesulfurize the refinery fuel gas stream. Also, the more typical application of hydrodesulfurization is in the desulfurization of liquid hydrocarbons, as opposed to gaseous hydrocarbons, that contain organic sulfur species, which are converted to hydrogen sulfide. The hydrogen sulfide is then, generally, by use of a stripping step, removed along with the other gaseous components that are yielded from the hydrodesulfurization reaction step. One would not contemplate the need to convert gaseous organic sulfur compounds that are contained in a refinery fuel gas stream to hydrogen sulfide that would then remain in the hydrotreated fuel gas stream that is further treated using conventional absorption methods.

It is also recognized that prior to the implementation of the more stringent sulfur regulations for refinery fuel gas, as referenced above, there was no need to remove the difficult sulfur compounds; because, their presence typically was in small enough concentration levels as not to require their removal. Thus, one skilled in the art would not have been motivated to use such a severe treatment as catalytic hydrodesulfurization or hydrotreating to remove sulfur from a refinery fuel gas stream.

In the inventive process, the processing of the fuel gas stream includes the use of an elongated reactor vessel having a length and which contains at least one bed of hydrodesulfurization catalyst. The inside wall of the elongated reactor vessel defines a volume that is filled with hydrodesulfurization catalyst that forms the bed of catalyst. The bed of catalyst may be defined in terms of a bed height that is measured from the bottom surface of the bed of catalyst to the top surface of the bed of catalyst. The elongated reactor vessel may further include within it additional separate beds of catalyst that are placed therein along its length. For instance, the elongated reactor vessel can include within its volume more than one, or at least two, separate catalyst beds, including a first upper catalyst bed and a second lower catalyst bed. In a hydrodesulfurization reactor vessel that is elongated in the vertical direction, the first upper catalyst bed is placed at a relative location within the reactor vessel that is above the placement of the second lower catalyst bed within the reactor vessel. The first upper catalyst bed can comprise a first hydrodesulfurization catalyst, and the second lower catalyst bed can comprise a second hydrodesulfurization catalyst.

At least a portion of the fuel gas stream that contains organic sulfur and light olefins is introduced at a first introduction point into the elongated reactor vessel wherein it is contacted with the hydrodesulfurization catalyst under suitable hydrodesulfurization process conditions so as to convert the sulfur compounds to hydrogen sulfide and to saturate the olefins. In one embodiment of the inventive process, a quench gas stream is additionally introduced into the elongated reactor vessel at a second introduction point along its length that is below the first introduction point of the fuel gas stream. The relative locations of the two introduction points is significant because of the large concentration of light olefins in the fuel gas stream that is to be hydrotreated. As is addressed in more detail below, it is preferred for the quench gas stream to be a portion of the fuel gas stream.

As the fuel gas stream passes through the bed of hydrodesulfurization catalyst the light olefins contained therein will react and become saturated with hydrogen. This saturation of the light olefins is highly exothermic, and, because of the large amount of light olefins contained in the fuel gas stream, results in an extraordinary amount of heat release. In order to limit the temperature increase across the catalyst bed or beds within the elongated reactor vessel a recycle portion of the reactor effluent yielded from the elongated reactor vessel can be recycled and introduced along with the introduction of the fuel gas stream into the elongated reactor vessel or otherwise mixed with the fuel gas stream prior to its introduction into the elongated reactor vessel. The amount of recycle portion of the reactor effluent recycled and introduced into the elongated reactor vessel can be adjusted to allow for the control and limitation of the temperature increase across the at least one bed of hydrodesulfurization catalyst.

With the introduction of the quench gas stream at a location below that of the first introduction point of the fuel gas stream, a quenching effect is provided whereby the temperature of the resulting hydrotreated fuel gas stream within the elongated reactor vessel is reduced. As previously noted, in one embodiment of the invention the quench gas stream can be or include a portion of the fuel gas stream. This provides the additional benefit of allowing for the division of the fuel gas stream into one or more aliquot portions with the introduction thereof into the elongated reactor vessel being, preferably, at one or more locations along its length, thus, providing for a more even distribution of the temperature exotherm and profile within the bed or beds of hydrodesulfurization catalyst contained within the elongated reactor vessel.

As earlier noted, due to the narrow range of olefin compounds contained in the fuel gas stream, most of the olefins will tend to react in a localize area within the catalyst bed upon their contact therewith, and, to more effectively utilize the catalyst bed, it can be advantageous to introduce the fuel gas stream at the various locations along the length of the elongated reactor vessel. Also, the introduction of the fuel gas stream at the various locations along the elongated reactor vessel provides for the reaction of the olefins therein prior to mixing the resulting hydrotreated fuel gas stream with the quench gas stream or streams that contain reactive light olefins. The resulting hydrotreated fuel gas stream within the elongated reactor vessel, therefore, can serve as a diluent that contains essentially no reactive components.

The flow of quench gas that is introduced at the second introduction point is adjusted generally to be a desired ratio of such quench gas flow to the flow of the already hydrotreated fuel gas within the elongated vessel at the location of the second introduction point where the two are mixed. This desired ratio is such as to allow for the control of the temperature increase across the remaining portion of the catalyst bed, or across the next catalyst bed, within the elongated reactor vessel through which the mixture of quench gas and hydrotreated fuel gas diluent passes. The temperature at which the quench gas is introduced is selected so as to provide a desired temperature of the mixture and can vary depending upon a number of factors, such as, for example, the temperature of the hydrotreated fuel gas diluent and the concentration of olefins contained in the quench gas stream. If the quench gas stream contains a significant concentration of olefins, it can be desirable to recycle a portion of the reactor effluent to be combined with the quench gas stream for introduction into the elongated reactor vessel. In this case, it also can be desirable for the introduction temperature of the quench gas stream, along with the recycle portion of the reactor effluent, to be below the temperature of the hydrotreated fuel gas diluent at the location within the elongated reactor vessel.

The introduction of a portion of the fuel gas stream as a quench gas stream provides a benefit in the operation of the elongated reactor vessel for hydrodesulfurization by reducing the amount of the reactor effluent that is required to be recycled as diluent feed to the elongated reactor vessel in order to provide control over the temperature rise across the one or more catalyst beds therein. It is recognized that the larger the proportion of the fuel gas stream that is utilized as the quench gas stream and the more locations along the elongated reactor vessel at which a portion of the fuel gas stream is introduced as a quench gas stream, the smaller the volume of reactor effluent that is required to be recycled to provide the necessary temperature control across the catalyst bed or beds of the elongated reactor vessel. This reduction in the amount of reactor effluent being recycled provides the advantage of reducing energy costs associated with heating and cooling of the recycle stream and utility costs associated with the operation of a recycle compressor.

The fuel gas stream of the inventive process can contain a concentration of at least one sulfur compound and a concentration of at least one light olefin. The sulfur compounds that can be present in the fuel gas stream can include organic sulfur compounds that include thiol compounds, thiophene compounds, disulfide compounds and carbonyl sulfide. The thiol compounds can include one or more of the various aliphatic mercaptans, such as, for example, methyl mercaptan, ethyl mercaptan, propyl mercaptan, butyl mercaptan, and amyl mercaptan, and aromatic mercaptans, such as, for example, phenyl mercaptan. The thiopheneic compounds can include thiophene and any of the benzothiophenes and substituted thiophenes.

The concentration of the mercaptans in the fuel gas stream is generally in the range upwardly to 5000 ppmv (0.5 volume percent of the fuel gas stream). But, for the inventive process, the mercaptan concentration in the fuel gas stream to be treated will, typically, be more than 20 ppmv and in the range of from 20 ppmv to 3000 ppmv. More typically, the mercaptan concentration is in the range of from 40 ppmv to 2000 ppmv, and, most typically, from 45 ppmv to 1500 ppmv.

The organic sulfur compounds that include thiophenes, organic disulfides and carbonyl sulfide are the more difficult compounds to remove from a fuel gas stream by use of conventional sulfur removal methods. The concentration of the these organic sulfur compounds in the fuel gas stream of the inventive process can, collectively, be in the range of from 1 ppmv to 500 ppmv, but, typically, the collective concentration of these organic sulfur compounds will be in the range of from 2 to 300 ppmv, and, more typically, from 3 to 200 ppmv. The specific concentration of the carbonyl sulfide in the fuel gas stream can be upwardly to 500 ppmv, and, more typically, from 1 to 300 ppmv.

The total concentration of all the organic sulfur compounds, including thiol compounds, thiophene compounds, disulfide compounds and carbonyl sulfide, contained in the fuel gas stream of the inventive process is, typically, in the range of from 40 ppmv to 5000 ppmv. More typically, the total concentration of all the organic sulfur compounds contained in the fuel gas stream to be treated is in the range of from 45 ppmv to 3000 ppmv, and, most typically, from 50 ppmv to 2000 ppmv.

As for the concentration of light olefins of the fuel gas stream to be treated by the inventive process, it can, depending upon the particular source or sources of the fuel gas streams, be in the range upwardly to 50 volume percent (%) of the fuel gas stream. For instance, an FCC dry gas will contain significantly higher quantities of light olefins as compared to fuel gas streams from other sources, but, typically, the light olefin concentration of the fuel gas stream of the inventive process will be in the range of from 0.1 vol % to 45 vol %, more typically, from 0.5 vol % to 40 vol %, and, most typically, from 1 vol % to 30 vol %.

The inventive process is particularly directed to the processing of one or a combination of more than one refinery gas streams that is yielded from any of the numerous process units of a crude oil refinery. Typical refinery gas streams that are to be feed streams to the elongated reactor vessel, or hydrotreater reactor, of the inventive process are those generated by a delayed coker unit, such as the coker dry gas and coker propylene vapor, a fluid catalytic cracking unit, such as the FCC dry gas, a flare gas recovery system, tank vents, and vapor overheads from crude unit atmospheric and vacuum towers. The gas streams yielded from these process units can have significant concentrations of organic sulfur compounds. The types and concentrations of the organic sulfur compounds are as previously described in detail herein.

An additional characteristic of the refinery gas streams is that they can include significant concentration levels of light or lower olefin compounds, such as ethylene, propylene, butenes and pentenes. More typically, the lower olefin compounds contained in the refinery fuel gas streams of the inventive process include those selected from the group consisting of ethylene, propylene, butylenes and any combination thereof. Typical concentration ranges for these light olefins in the refinery gas streams are as previously described herein.

The hydrotreating catalyst of the inventive process is typically used to form one or more beds of hydrotreating catalyst within the hydrotreater reactor and can be any suitable hydrogenation catalyst including conventional hydrotreating catalysts that comprise a metal component on a support material. The metal component can include a Group VIB metal component or a Group VIII metal component, or both metal components. It is preferred for the hydrotreating catalyst to comprise both a Group VIB metal component and a Group VIII metal component. The hydrotreating catalyst can also include a promoter such as a phosphorous component.

The Group VIII metal component of the hydrotreating catalyst composition is selected from those Group VIII metal or metal compounds that, in combination with the other components of the catalyst composition, suitably provide a hydrotreating catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydrotreating catalyst composition can be in the elemental form or in the form of a metal compound, such as, for example, oxides, sulfides and the like. The amount of Group VIII metal in the hydrotreating catalyst composition can be in the range of from about 0.1 to about 6 weight percent elemental metal based on the total weight of the hydrotreating catalyst composition. Preferably, the concentration of Group VIII metal in the hydrotreating catalyst composition is in the range of from 0.3 weight % to 5 weight %, and, most preferably, the concentration is in the range of from 0.4 weight % to 4.5 weight %.

The Group VIB metal component of the hydrotreating catalyst composition is selected from those Group VIB metal or metal compounds that, in combination with the other elements of the hydrotreating catalyst composition, suitably provide a hydrotreating catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydrotreating catalyst composition can be in the elemental form or in the form of a metal compound, such as, for example, oxides, sulfides and the like. The amount of Group VIB metal in the hydrotreating catalyst composition can be in the range of from about 2 to about 25 weight percent elemental metal based on the total weight of the hydrotreating catalyst composition. Preferably, the concentration of Group VIB metal in the hydrotreating catalyst composition is in the range of from 6 weight % to 18 weight %, and, most preferably, the concentration is in the range of from 7 weight % to 16 weight %.

The support material of the hydrotreating catalyst can be any material that suitably provides a support for the metal hydrogenation components of the hydrotreating catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 30 Angstroms to about 500 Angstroms, preferably, from 50 Angstroms to 400 Angstroms, and, most preferably, from 60 Angstroms to 300 Angstroms. The total pore volume of the porous refractory oxide, as measured by standard mercury porosimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 50 m$^2$/gram, and it is typically in the range of from about 100 to about 500 m$^2$/gram.

The temperature and pressure conditions within the elongated reactor vessel are controlled so as to provide suitable hydrodesulfurization reaction conditions for the hydrogenation of the organic sulfur compounds contained in the fuel gas stream introduced into the elongated reactor vessel. The contacting temperature should generally be in the range of from 150° C. (302° F.) to 480° C. (896° F.), preferably, from 200° C. (392° F.) to 430° C. (806° F.), and, most preferably, from 230° C. (446° F.) to 340° C. (644° F.). As for the contacting pressure, it should generally in the range of from 30 psig to 600 psig, preferably, from 50 psig to 500 psig, and, most preferably, from 70 psig to 400 psig.

In order to realize an optimum benefit from the inventive process, it is particularly desirable for the fuel gas stream that is introduced into the elongated reactor vessel at the first introduction point to have a first introduction temperature that is within the previously recited ranges for the contacting temperature and for the quench gas stream that is introduced into the elongated reactor vessel at the second introduction point to have a second introduction temperature. It is particularly desirable for the first introduction temperature to be greater than the second introduction temperature. This relative temperature difference provides for the quenching benefit.

The second introduction temperature of the quench gas stream can, as noted above, vary widely depending upon various factors and can be in the range upwardly to 480° C. In the case where the quench gas stream has a significant olefins content, the second introduction temperature ought to be less than the first introduction temperature. The second introduction temperature, thus, can be in the range of from 35° C. (95° F.) to 150° C. (302° C.), preferably, from 40° C. (104° F.) to 120° C. (248° F.), and, most preferably, from 45° C. (113° F.) to 110° C. (230° F.).

The flow rates at which the fuel gas stream is charged to the elongated reactor vessel of the inventive process are generally such as to provide a gaseous hourly space velocity (GHSV) in the range of from 0.01 hr$^{-1}$ to 6000 hr$^{-1}$. The term "gaseous hourly space velocity," as used herein, means the numerical ratio of the rate at which the fuel gas stream, including added hydrogen, if any, that is charged to the elongated reactor vessel in volume (at standard temperature and pressure conditions) per hour divided by the volume of hydrotreating catalyst contained in the elongated reactor vessel to which the fuel gas stream is charged. The preferred GHSV is in the range of from 0.05 hr$^{-1}$ to 4000 hr$^{-1}$, more preferably, from 0.1 hr$^{-1}$ to 3000 hr$^{-1}$, and, most preferably, from 0.2 hr$^{-1}$ to 2800 hr$^{-1}$.

The amount of hydrogen that is fed to the elongated reactor vessel should be sufficient to allow for the conversion of the sulfur compounds of the fuel gas stream to hydrogen sulfide and, thus, will depend upon the hydrogen demand for converting the organic sulfur and for hydrogenating the olefins of the fuel gas stream. The hydrogen contained in the fuel gas stream may be sufficiently high to provide the required hydrogen, but, if not, make-up hydrogen may be used.

The reactor effluent that is yielded from the elongated reactor vessel contains hydrogen sulfide that is produced by the hydrogenation of the organic sulfur compounds contained in the refinery fuel gas stream that is contacted with the hydrodesulfurization catalyst under hydrodesulfurization process conditions. The concentration of the organic sulfur compounds in the reactor effluent, thus, is significantly below the concentration of organic sulfur compounds that is in the fuel gas stream charged to the elongated reactor vessel.

It is desirable for the concentration of organic sulfur compounds in the reactor effluent to be significantly reduced below that of the fuel gas stream such that it is less than 40 ppmv, and, preferably, the significantly reduce organic sulfur concentration of the reactor effluent is less than 35 ppmv.

More preferably, the organic sulfur concentration of the reactor effluent is less than 30 ppmv, and, most preferably, less than 20 ppmv or even less than 10 ppmv. While it is recognized that there are practical limits as to how low the organic sulfur concentration of the fuel gas stream may be reduced, it is desirable to reduce the organic sulfur concentration to as low as is feasible.

To provide a treated fuel gas that can suitably be combusted, it is desirable to remove at least a significant portion of the hydrogen sulfide that is contained in the reactor effluent to give the treated fuel gas that has a suitably low sulfur content. Any suitable means or method known to those skilled in the art can be used to treat the reactor effluent to provide the treated fuel gas having a reduced concentration of hydrogen sulfide. One preferred method of treating the reactor effluent includes traditional absorption scrubbing of the reactor effluent to remove the hydrogen sulfide contained therein. This is done by contacting the reactor effluent with a suitable absorbent and yielding a treated fuel gas having a reduced concentration of hydrogen sulfide and the absorbent that is rich in hydrogen sulfide. Among the absorption processes that may suitably be used to treat the reactor effluent, amine treating is preferred. Amine treating includes the use of any known amine absorbents such as, for example, monoethanolamine (MEA), diethanolamine (DEA), methyldiethanolamine (MDEA), diisopropylamine (DIPA), and diglycolamine (DGA).

The treated fuel gas stream should have a concentration of hydrogen sulfide of less than 100 ppmv or less than 40 ppmv, preferably, less than 20 ppmv, and, most preferably, less than 10 ppmv. This reduced concentration of hydrogen sulfide provides a treated fuel gas that will meet most of the more stringent sulfur regulations and has a suitably low hydrogen sulfide concentration such that it may be combusted or burned in the typical combustion devices or means for combusting or burning a treated fuel gas of a plant, such as, for example, the burners that are used in refinery heaters, furnaces, flares and other equipment.

Reference is now made to the process flow schematic of FIG. 1, which includes for illustrative purposes various embodiments of the inventive process. Depicted in FIG. 1 is a fuel gas treating process 10 for the removal of sulfur from a fuel gas stream that additionally contains a light olefin as well as an organic sulfur compound. The fuel gas stream is fed to the fuel gas treating process 10 by way of conduit 12 and is passed to feed/effluent heat exchanger 14. The feed/effluent heat exchanger 14 provides for the exchange of heat energy between at least a portion of the fuel gas stream passing through conduit 12 and at least a portion of the reactor effluent passing from elongated reactor vessel 16 through conduit 18. The fuel gas stream that has been heated to a first introduction temperature by use of the feed/effluent heat exchanger 14 passes to the elongated reactor vessel 16 by way of conduit 20 to the first introduction point 22 of the elongated reactor vessel 16.

The elongated reactor vessel 16 has a length 24 and an inside wall that defines a volume that is filled with at least one bed of hydrodesulfurization catalyst including a first upper catalyst bed 26, comprising a first hydrodesulfurization catalyst, and a second lower catalyst bed 28, comprising a second hydrodesulfurization catalyst. The first introduction point 22 into the elongated reactor vessel 16 is at a location that is preferably above the top surface 30 of the upper catalyst bed 26. The elongated reactor vessel 16 is operated at suitable hydrodesulfurization reaction conditions which provide from yielding from therefrom through conduit 18 of a reactor effluent that contains hydrogen sulfide and a significantly reduced organic sulfur concentration that is below that of the fuel gas stream being fed to the fuel gas treating process 10 by way of conduit 12.

The quench gas stream passes by way of conduit 32 and is introduced into the elongated reactor vessel 16 at a second introduction point of any one or more of a multiplicity of locations 34, 36, 38, 40, and 42 along the length 24 of the elongated reactor vessel 16 that are below the location of the first introduction point 22. The quench gas stream may, for example, be introduced at a location 38 that is between the first upper catalyst bed 26 and the second lower catalyst bed 28, or it may be introduced into the first upper catalyst bed 26 at locations 34 and 36, or it may be introduced into the second lower catalyst bed 28 at locations 40 and 42, or it may be introduced at any combination of locations 34, 36, 38, 40 and 42.

The quench gas stream is mixed with the hydrotreated fuel gas diluent within the elongated reactor vessel 16 at each of the locations 34, 36, 38, 40 and 42 at which the quench gas stream is introduced. For example, the quench gas stream this is introduced at location 38 is mixed with the hydrotreated fuel gas diluent at location 43 within the elongated reactor vessel 16 that is passing through the upper catalyst bed 26 in the direction indicated by the arrow 44.

A cooled reactor effluent passes from the feed/effluent heat exchanger 14 by way of conduit 46 to absorption unit 48. Absorption unit 48 provides for the removal of hydrogen sulfide that is contained in the cooled reactor effluent by contacting it with a suitable absorbent fluid. A lean absorbent fluid is introduced to the absorption unit 48 through conduit 50 and a rich absorbent fluid containing hydrogen sulfide that is removed from the cooled reactor effluent passes from the absorption unit 48 by way of conduit 52. A treated fuel gas having a significantly reduced concentration of hydrogen sulfide passes from the absorption unit 48 by way of conduit 54 to any suitable combustion device or means (not shown) for burning or combusting the treated fuel gas, such as, for example, burners that are used in refinery heaters, furnaces, flares and other equipment.

As shown in FIG. 1, the quench stream passing through conduit 32 and introduced into elongated reactor vessel 16 can include a portion of the fuel gas stream that is passing through conduit 12 to the fuel gas treating process 10. Also, the quench stream introduced into elongated reactor vessel 16 can include a portion of the reactor effluent passing through conduit 18 or cooled reactor effluent passing through conduit 46 that is introduced into elongated reactor vessel 16 by way of conduits 56 and 32. A recycle portion of the rector effluent is recycled by way of either conduit 58 or conduit 60, or both, to be either combined as a diluent with the fuel gas stream being fed to the fuel gas treating process 10 or otherwise being introduced with the fuel gas stream into elongated reactor vessel 16.

That which is claimed is:

1. A process for removing sulfur from a fuel gas stream that comprises an organic sulfur compound and a light olefin, wherein said process comprises:

introducing said fuel gas stream at a first introduction point into an elongated reactor vessel having a length and containing a bed of a hydrodesulfurization catalyst wherein said fuel gas stream is contacted with said hydrodesulfurization catalyst under hydrodesulfurization process conditions;

introducing a quench gas stream at a second introduction point into said elongated reactor vessel at a location along said length of said elongated reactor vessel that is below said first introduction point; and yielding from said elongated reactor vessel a reactor effluent containing hydrogen sulfide and a significantly reduced organic sulfur concentration that is below the organic sulfur concentration of said fuel gas stream.

2. A process as recited in claim 1, wherein said bed of said hydrodesulfurization catalyst includes at least two separate catalyst beds including a first upper catalyst bed, comprising a first hydrodesulfurization catalyst, and a second lower catalyst bed, comprising a second hydrodesulfurization catalyst; and wherein said first introduction point provides for introduction of said fuel gas stream into said first upper catalyst bed and the contacting of said fuel gas stream with said first hydrodesulfurization catalyst of said first upper catalyst bed.

3. A process as recited in claim 2, further comprising: passing said reactor effluent to an absorption unit whereby said reactor effluent is treated to remove hydrogen sulfide therefrom to yield a treated fuel gas having a reduced concentration of hydrogen sulfide.

4. A process as recited in claim 3, wherein said reduced concentration of hydrogen sulfide is less than 100 ppmv.

5. A process as recited in claim 4, wherein said quench gas stream includes a portion of said fuel gas stream.

6. A process as recited in claim 5 wherein said quench gas stream includes a portion of said reactor effluent.

7. A process as recited in claim 6, further comprising: recycling a recycle portion of said reactor effluent and introducing said recycle portion with the introduction of said fuel gas stream into said elongated reactor vessel.

8. A process as recited in claim 7, wherein said fuel gas stream at said first introduction point has a first introduction temperature, and wherein said quench gas stream at said second introduction point has a second introduction temperature, and wherein said first introduction temperature is greater than said second introduction temperature.

9. A process as recited in claim 8, wherein said organic sulfur compound is selected from the group consisting of carbonyl sulfide, methyl mercaptan, ethyl mercaptan, propyl mercaptan, butyl mercaptan, and amyl mercaptan; and wherein said light olefin is selected from the group consisting of ethylene, propylene and butylenes.

10. A process as recited in claim 9, wherein said significantly reduced organic sulfur concentration is a reactor effluent organic sulfur concentration of less than 40 ppmw sulfur.

11. A process as recited in claim 10, wherein said hydrodesulfurization catalyst comprises: an inorganic oxide and an active hydrogenation metal component, wherein the metal of said active hydrogenation metal component is selected from the group of metals consisting of cobalt, nickel, chromium, molybdenum, and tungsten.

12. A process as recited in claim 1, further comprising: recycling a recycle portion of said reactor effluent and introducing said recycle portion with the introduction of said fuel gas stream into said elongated reactor vessel.

13. A process as recited in claim 12, wherein said fuel gas stream at said first introduction point has a first introduction temperature, and wherein said quench gas stream at said second introduction point has a second introduction temperature, and wherein said first introduction temperature is greater than said second introduction temperature.

14. A process as recited in claim 2, further comprising: recycling a recycle portion of said reactor effluent and introducing said recycle portion with the introduction of said fuel gas stream into said elongated reactor vessel.

15. A process as recited in claim 14, wherein said fuel gas stream at said first introduction point has a first introduction temperature, and wherein said quench gas stream at said second introduction point has a second introduction temperature, and wherein said first introduction temperature is greater than said second introduction temperature.

16. A process as recited in any one of claims 1, 2, 3, 4, 5, 12, 13, 14 and 15, wherein said organic sulfur compound is selected from the group consisting of carbonyl sulfide, a mercaptan compound, methyl mercaptan, ethyl mercaptan, propyl mercaptan, butyl mercaptan, and amyl mercaptan; and wherein said light olefin is selected from the group consisting of ethylene, propylene and butylenes, wherein said significantly reduced organic sulfur concentration is a reactor effluent organic sulfur concentration of less than 40 ppmw sulfur, and wherein said hydrodesulfurization catalyst comprises: an inorganic oxide and an active hydrogenation metal component, wherein the metal of said active hydrogenation metal component is selected from the group of metals consisting of cobalt, nickel, chromium, molybdenum, and tungsten.

* * * * *